Figure 1:
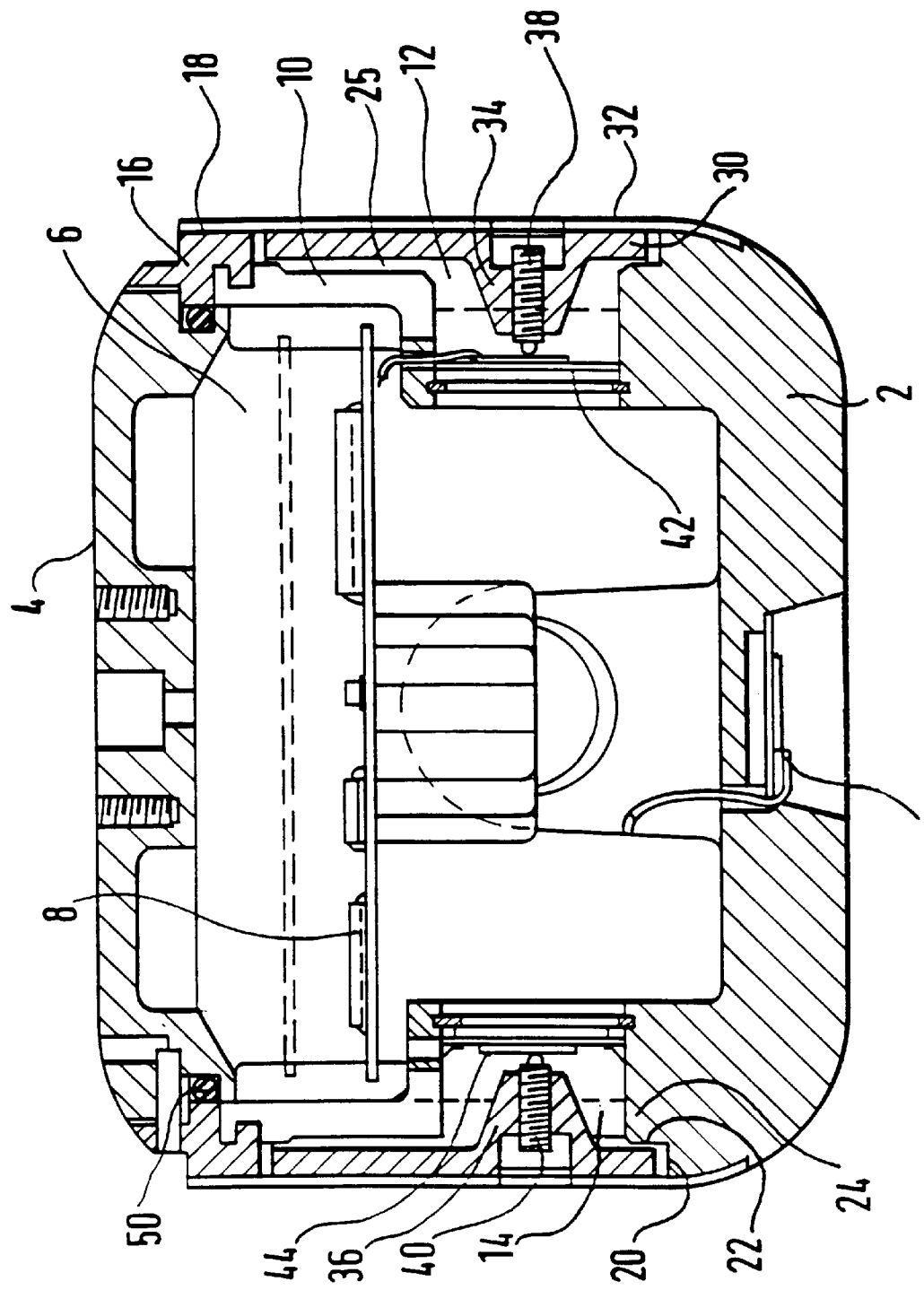

United States Patent [19]
Delany et al.

[11] Patent Number: 5,949,742
[45] Date of Patent: Sep. 7, 1999

[54] DIFAR SENSOR

[75] Inventors: John Lionel Delany; David Edwin James Buckingham, both of Greenford, United Kingdom

[73] Assignee: Ultra Electronics Limited, Middlesex, United Kingdom

[21] Appl. No.: 09/011,140

[22] PCT Filed: Sep. 6, 1996

[86] PCT No.: PCT/GB96/02207

§ 371 Date: May 14, 1998

§ 102(e) Date: May 14, 1998

[87] PCT Pub. No.: WO97/10518

PCT Pub. Date: Mar. 20, 1997

[30] Foreign Application Priority Data

Sep. 11, 1995 [GB] United Kingdom .................. 9518528

[51] Int. Cl.[6] .................................................. H04R 1/44
[52] U.S. Cl. ................................................................ 367/188
[58] Field of Search ...................................... 367/165, 173, 367/178, 180, 188

[56] References Cited

U.S. PATENT DOCUMENTS

| | | | |
|---|---|---|---|
| 3,739,202 | 6/1973 | Cady | 367/180 |
| 3,803,546 | 4/1974 | Leon | 367/155 |
| 4,326,275 | 4/1982 | Butler | 367/173 |
| 4,928,263 | 5/1990 | Armstrong et al. | 367/180 |

FOREIGN PATENT DOCUMENTS

| | | |
|---|---|---|
| 0098017 | 1/1984 | European Pat. Off. . |
| 0375304 | 6/1990 | European Pat. Off. . |

*Primary Examiner*—Daniel T. Pihulic
*Attorney, Agent, or Firm*—Baker & Botts, L.L.P.

[57] ABSTRACT

A direction finding and ranging (DIFAR) sensor is provided in which a relatively light sensing element (30) that undergoes motion in response to an acoustic wave is disclosed. The motion of the sensing element relative to an inertial mass (2, 4) is measured along two mutually perpendicular directions to determine the direction of propagation of the acoustic wave. The construction of the DIFAR sensor enables the contact between the sensing element (30) and internally disposed relative motion transducers to be adjusted after assembly of the DIFAR sensor.

24 Claims, 2 Drawing Sheets

DIFAR SENSOR

The present invention relates to a direction finding and ranging (DIFAR) transducer. The transducer is particularly suited to underwater applications including sonobuoys, but could also be used for seismic and air-borne sound applications.

DIFAR sensors, such as DIFAR hydrophones, have been used in sonobuoys for approximately twenty years. A known DIFAR hydrophone is described in U.S. Pat. No. 4,928,263. The hydrophone described therein comprises a hollow shell containing a mounting element from which an inertial mass is suspended by a relatively stiff suspension. The mounting element typically has a mass several times (often 10 or more) greater than that of the inertial mass. The inertial mass has four upwardly extending pins arranged in a cruciform fashion which engage piezoelectric elements which detect wobble of the inertial mass relative to the mounting element. During construction, screw threaded adjusters are used to adjust the force acting between the inertial mass and the piezoelectric elements. Once the screw threaded adjusters have been set, a canister is rigidly fastened to the underside of the mounting element so as to enclose the inertial mass and oil may be introduced into the canister. Furthermore, an 'O' ring seal is provided between the inertial mass and the canister. This arrangement is then sealed within a waterproof housing. The known sonobuoy has a relatively complex construction.

Furthermore, a pressure wave impinging upon the surface of the sonobuoy is required to accelerate both the waterproof housing and the mounting element in order to induce relative motion of the mounting element and the inertial mass.

According to the present invention, there is provided a DIFAR sensor, comprising: an inertial mass; a sensing element comprising a wall portion enclosing a volume and upon which a surrounding medium exerts a pressure and which undergoes displacement in response to an acoustic pressure wave acting thereon; and sensors for sensing motion of the sensor element along two mutually orthogonal directions, in which the mass of the sensing element is less than the mass of the inertial mass.

Preferably, the mass of the inertial mass is more than ten times that of the sensing element.

Preferably, the DIFAR sensor is generally cylindrical and the wall portion is in the form of a hollow cylindrical wall coaxially mounted with the inertial mass.

The sensing element may include an integrally formed end cap, thereby effectively forming a sensing dome. Alternatively, the sensing a element may comprise an annular ring located between opposing sensor end portions which cooperate to form the inertial mass.

Advantageously, the sensing element is in floating contact with the inertial mass. The sensing element may be connected to the inertial mass by an elastomeric element which serves to urge the sensing element towards a predetermined rest position with respect to the inertial mass, but which also allows limited relative movement between the sensing element and the inertial mass. Advantageously, the elastomeric element forms a fluid-tight seal between the sensing element and the inertial mass.

Preferably, the sensing element carries radially inwardly facing projections which are arranged to cooperate with the sensors. The sensors may, for example, be strain gauges or displacement sensors. The projections may carry adjustors, such as screw threaded elements, whereby the force exerted on each sensor by the respective projection can be adjusted whilst the sensing element is at its rest position. Advantageously, the adjustors can be adjusted via access ports formed in the sensing element such that the adjustments can be made once the DIFAR sensor has been assembled. This has significant advantages compared with the manufacture of know DIFAR sensors, wherein such adjustments are made before the assembly of the sensor is completed.

Alternatively, the relative movement of the sensing element with respect to the inertial mass may be sensed in a non-contacting manner. Optical, electrical or magnetic non-contacting sensors may be used. For example, a light source may be located within the inertial mass and arranged to illuminate a local area of the sensing element. An adjacent optical detector may then be able to detect movement of the sensing element through changes in the light intensity or by interferometry. Alternatively, motion of the sensing element may be measured by measuring the capacitance between local sections of the inertial mass and corresponding sections of the sensor element.

The provision of a DIFAR sensor having a relatively light rigid sensing element, which to some extent acts as a shell at least partially surrounding the inertial mass, enables increased sensitivity to be achieved compared to prior art designs.

Figure 2:
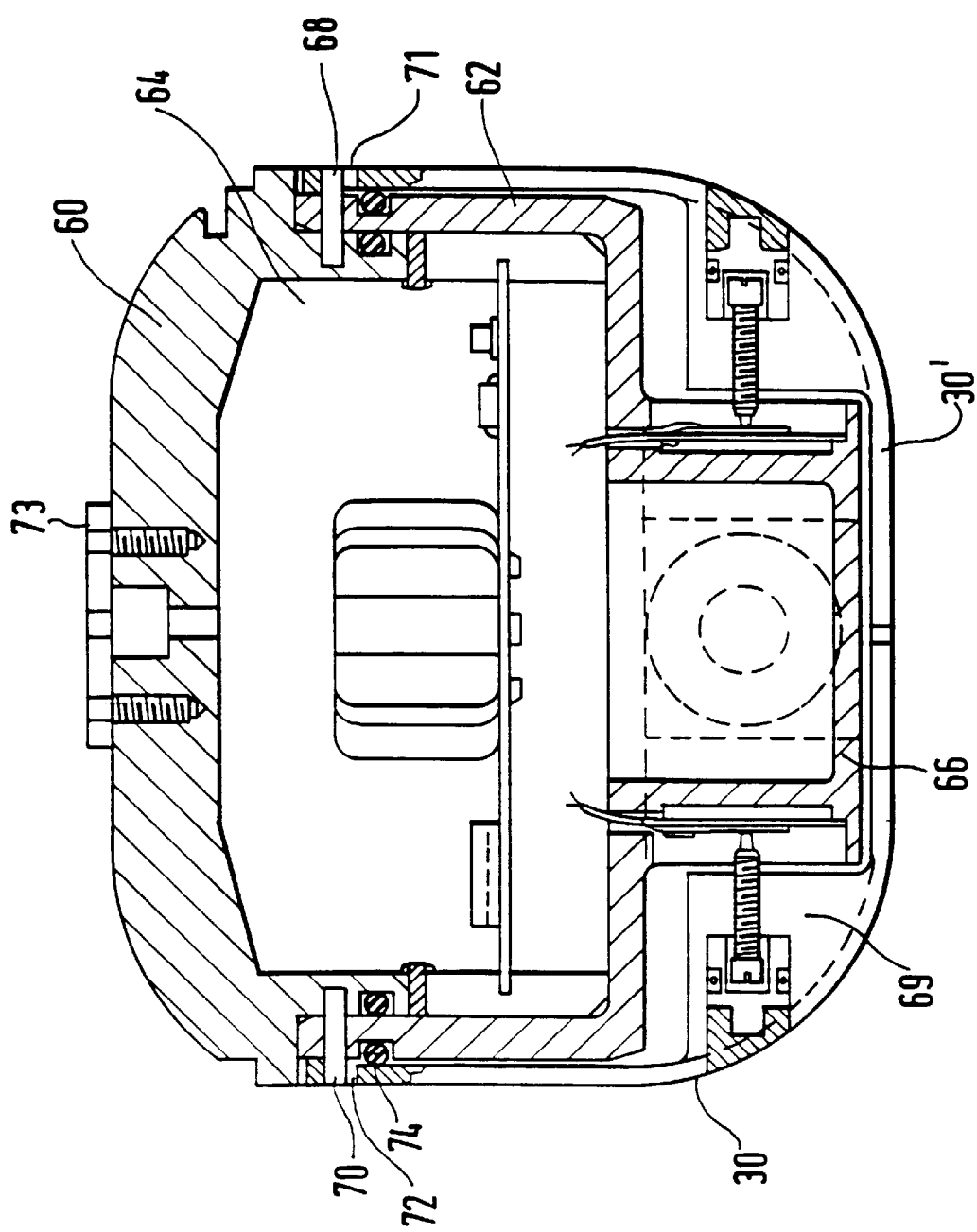

The present invention will further be described, by way of example, with reference to the accompanying drawings, in which:

FIG. 1 shows a cross-section through a DIFAR sensor constituting a first embodiment of the present invention; and FIG. 2 shows a cross-section through a second embodiment of the present invention.

The DIFAR sensor shown in FIG. 1 comprises a circular base 2 which cooperates with a circular top 4 to form an inertial mass. The base 2 and top 4 cooperate to define opposing ends of a chamber 6 which houses processing electronics 8. A cylindrical wall 10 extends between the base 2 and the top 4. The wall 10 has four equally spaced recesses formed therein which receive transducer elements. Two of these recesses 12 and 14 are shown in FIG. 1. A retaining ring 16 engages the top 4 and extends radially outward therefrom to define an outer surface 18 which is aligned with the surface of the widest portion of the base 2. The base 2 has an upwardly facing circular ledge 20 which extends between the circumference of the base 2 at its widest part, and a vertical wall 22 of an annular region 24 of the base 2. The ledge 20, the retaining ring 16, and the wall 10, cooperate to define an annular recess 25 and also define the sides of the chamber 6. A sensing element 30 in the form of an annular wall is disposed within the annular recess. An elastomer, such as polyurethane or silicone rubber, is applied as skin 32 encircling and making fluid sealed engagement with the retaining ring 16, the sensing element 30 and the base 2.

The sensing element 30 has four equally spaced inwardly facing projections formed thereon. Two projections 34 and 36 are illustrated in FIG. 1. Each projection 34 and 36 has a screw threaded passage therein which extends between an innermost portion of the projection and an associated access hole formed in the sensing element 30 and the elastomeric skin 32. Screw threaded adjustment elements 38 and 40 provide adjustable projections that project inwardly of the sensing element 30. After adjustment of the elements 38 and 40, the outer surface thereof is sealed against the environment by elastomeric plugs and adhesive.

Each recess in the wall 10 carries a piezoelectric transducer mounted on a flexible diaphragm. Two transducers 42 and 44 are shown in FIG. 1. The screw threaded element 38 is adjusted so as to bear against the transducer 42. Similarly, the screw threaded element 40 is adjusted to bear against the transducer 44.

The lowermost portion of the sensing element 30 encircles the wall 24, and consequently, the motion of the sensing element 30 is limited by the element 30 and the wall 22 coming into abutment. The screw threaded elements 38 and 40 are positioned such that they always maintain contact with the transducers 42 and 44, respectively. Similar considerations apply to the other transducers which lie above and below the plane of FIG. 1.

Signals from opposing piezoelectric transducers are processed so as to form a difference between the outputs of the sensors. The connections between the piezoelectric sensors 42 and 44 and the processing electronics 8 are enclosed within the DIFAR sensor arrangement and hence protected from the environment.

A ring seal 50 is provided between the top 4 and the retaining ring 16 so as to prevent the ingress of fluid within the chamber 6.

A further omnidirectional hydrophone 52 measuring the acoustic pressure wave directly may be provided in a recess formed in the base 2.

The base 2, ring 16 and the sensing element 30 may be made of aluminium while the top 4 may be made of zinc. The sensing element 30 has a mass of approximately one tenth of the mass of the inertial mass (i.e. base 2, top 4 and ring 16).

The propagation of an acoustic pressure wave generates local particle velocity fluctuations in the media through which the acoustic wave propagates. Particle velocity is a vectorial quantity which is directly related to the acoustic pressure and which is sensitive to the direction of acoustic propagation. This is in contrast to the acoustic pressure, per se, which is a scalar quantity and thus provides no directional information. The sensing element 30 is able to respond to fluctuations of the local particle velocity. It is well-known that as a body approaches neutral buoyancy it tends to move with the local particle velocity and consequently the sensing element 30 tends to move in the presence of an acoustic field. The inertial mass, formed by the bottom 2, the top 4, and the ring 16 and the processing electronics, will tend to remain unperturbed, and hence the acoustic pressure wave will introduce relative movement between the sensing element 30 and the inertial mass. This motion is transmitted to the piezoelectric sensors via the screw threaded elements extending between the piezoelectric sensors and the sensing element 30, and consequently an electrical signal is generated in response to relative movement of the sensing element. By arranging for a pair of piezoelectric sensors to be diagonally opposite one another within the inertial mass until, a displacement of the shell along the line between the opposing piezoelectric sensors will cause the sensors to be deflected in opposite senses. The signals resulting from motion of the sensing element 30 can be arranged to add constructively if the opposing piezoelectric elements are attached with their directions of polarisation in mutual opposition.

By providing four equally spaced sensors within the DIFAR sensor, displacement of the sensing element 30 can be resolved into two orthogonal directions so as to define a line of acoustic propagation from the ratio of the displacements along the orthogonal directions. This leaves an ambiguity in the direction of the line of propagation. However, this can be resolved by the addition of a conventional hydrophone measuring the acoustic pressure wave directly. Furthermore, by including a magnetic compass within the body of the DIFAR sensor, it is possible to relate the direction of propagation to a magnetic bearing. Such a combination of two orthogonal sensors (formed by sensor pairs) plus an omnidirectional hydrophone) is known in conventional DIFAR sonobuoys.

FIG. 2 illustrates an alternative embodiment of the present invention. As shown in FIG. 2, the inertial mass is divided into an upper portion 60 and a lower portion 62 which are removably connected to one another and define a chamber 64. The lower inertial mass portion 62 has a downwardly extending cylindrical portion 66 which carries four diaphragms equally spaced about its periphery, each diaphragm carrying a piezoelectric transducer. The sensing element 30 is modified by the provision of an end cap 30 so as to form a dome. The dome encloses a volume 69. The dome 30 is supported on pins 68 and 70 which extend through apertures 71 and 72 formed in the uppermost portion of the wall of the sensing element and are held within locating recesses within the inertial mass portions 60 and 62. The sensing element 30 carries four screw threaded adjustors which are arranged to bear against and to deflect the diaphragms in a manner as described with reference to the embodiment shown in FIG. 1. The sensing element 30 has a cylindrical cavity formed therein which encircles the region 66 and which serves to limit the relative motion of the sensing element 30 with respect to the inertial mass 62 by virtue of abutting the portion 66 so as to define the limits of movement. An omnidirectional hydrophone 73 is attached to the DIFAR sensor in order to allow the actual direction of propagation of the acoustic wave to be resolved. An 'O' ring seal 74 is located in the annular gap between the lower inertial mass element 62 and the upper wall portion of the sensing element 30. The 'O' ring forms a fluid-tight seal. The volume 69 between the sensing element 30 and the lower inertial mass element 62 may be air filled, may be filled with the surrounding medium via holes formed in the sensing element 30, or may be filled with an oil, such as a silicon oil, to provide a controlled means of damping vibration of the sensing element 30. The sensing element 30 is relatively light compared to the inertial mass and is easily moved in response to an acoustic pressure wave. This enables the DIFAR hydrophone to achieve good sensitivity.

In each of the embodiment described in FIGS. 1 and 2, the mass of the sensing element 30 is approximately one tenth the mass of the inertial mass.

It is thus possible to provide a DIFAR sensor which is sensitive, robust and relatively easy to manufacture.

We claim:

1. A DIFAR sensor, comprising an inertial mass that contains a sensing element comprising a wall portion enclosing a volume and upon which a surrounding medium exerts a pressure and which undergoes displacement in response to an acoustic pressure wave acting thereon; and sensors for sensing motion of the sensor element along two mutually orthogonal directions, and in which the mass of the sensing element is less than the mass of the inertial mass, wherein the sensing element has an integrally formed first end cap, and in which a further part of the external surface of the DIFAR sensor is defined by a second end cap which forms part of the inertial mass.

2. A DIFAR sensor as claimed in claim 1, wherein the mass of the inertial mass is more than ten times the mass of the sensing element.

3. A DIFAR sensor as claimed in claim 1 wherein the wall portion is a cylindrical wall coaxially mounted with the inertial mass.

4. A DIFAR sensor, comprising:

a sensing element, which defines, in part, an external surface of the sensor, and upon which a surrounding medium exerts a pressure and which undergoes displacement in response to an acoustic pressure wave acting thereon;

an inertial mass; and a plurality of sensors for sensing motion of the sensing element relative to the inertial mass along two mutually orthogonal directions, wherein a further part of the external surface is defined by an end cap which forms part of the inertial mass, such that the mass of the sensing element is less than ten times the mass of the inertial mass.

5. A DIFAR sensor comprising an inertial mass that contains a sensing element comprising a wall portion enclosing a volume and upon which a surrounding medium exerts a pressure and which undergoes displacement in response to an acoustic pressure wave acting thereon; and sensors for sensing motion of the sensor element along two mutually orthogonal directions, and in which the mass of the sensing element is less than the mass of the inertial mass, wherein the sensing element comprises an annular ring located between opposing sensor end portions which cooperate to form the inertial mass.

6. A DIFAR sensor as claimed in claim 1 wherein the sensing element is in floating contact with the inertial mass.

7. A DIFAR sensor as claimed in claim 1 wherein the sensing element is connected to the inertial mass by an elastomeric element which serves to urge the sensing element towards a predetermined rest position with respect to the inertial mass, but which also allows limited relative movement between the sensing element and the inertial mass.

8. A DIFAR sensor as claimed in claim 1 wherein the sensing element carries radially inwardly facing projections which cooperate with respective sensors.

9. A DIFAR sensor as claimed in claim 8, wherein the projections carry adjustment means, whereby the force exerted on an associated sensor can be adjusted whilst the sensing element is at its rest position.

10. A DIFAR sensor as claimed in claim 9, wherein the adjustment means can be adjusted via access ports formed in the sensing element wherein adjustments can be made after the DIFAR sensor has been assembled.

11. A DIFAR sensor as claimed in claim 1 wherein the sensors are strain gauges or displacement sensors.

12. A DIFAR sensor as claimed in claim 1 wherein the sensors operate in a non-contact mode.

13. A DIFAR sensor as claimed in claim 12, wherein the sensors are optical, electrical, magnetic or capacitive sensors.

14. A DIFAR sensor as claimed in claim 4, wherein, the sensors are selected from optical, electrical, magnetic and capacitive sensors.

15. A DIFAR sensor as claimed in 4, wherein the sensing element has a portion which is a cylindrical wall coaxially mounted with the inertial mass.

16. A DIFAR sensor as claimed in claim 4, wherein the sensing element has an integrally formed end cap.

17. A DIFAR sensor as claimed in claim 4, wherein the sensing element comprises an annular ring located between opposing sensor end portions which co-operate to form the inertial mass.

18. A DIFAR sensor as claimed in claim 4, wherein the sensing element is in floating contact with the inertial mass.

19. A DIFAR sensor as claimed in claim 4, wherein the sensing element is connected to the inertial mass by an elastomeric element which serves to urge the sensing element towards a predetermined rest position with respect to the inertial mass, but which also allows limited relative movement between the sensing element and the inertial mass.

20. A DIFAR sensor as claimed in claim 4, wherein the sensing element carries radially inwardly facing projections which co-operate with respective sensors.

21. A DIFAR sensor as claimed in claim 4, wherein the projections carry adjustment means, whereby the force exerted on an associated sensor is adjusted whilst the sensing element is at its rest position.

22. A DIFAR sensor as claimed in claim 21, wherein the adjustment means is adjusted via access ports formed in the sensing element such that adjustments is made after the DIFAR sensor has been assembled.

23. A DIFAR sensor as claimed in claim 4, wherein the sensors are strain gauges or displacement sensors.

24. A DIFAR sensor as claimed in claim 4, wherein the sensors operate in a non-contact mode.

* * * * *